United States Patent
Cho et al.

[11] Patent Number: 5,971,846
[45] Date of Patent: Oct. 26, 1999

[54] DISCHARGED AIR CURRENT CONTROL APPARATUS OF AIR CONDITIONER AND METHOD THEREOF

[75] Inventors: Jae-Seok Cho, Seoul; Yong-Woong Bang, Suwon, both of Rep. of Korea

[73] Assignee: Samsung Electronics Co., Ltd., Suwon, Rep. of Korea

[21] Appl. No.: 08/859,936

[22] Filed: May 22, 1997

[30] Foreign Application Priority Data

| May 22, 1996 | [KR] | Rep. of Korea | 96-17550 |
| May 22, 1996 | [KR] | Rep. of Korea | 96-17551 |
| May 22, 1996 | [KR] | Rep. of Korea | 96-17552 |
| May 22, 1996 | [KR] | Rep. of Korea | 96-17553 |
| May 22, 1996 | [KR] | Rep. of Korea | 96-17554 |

[51] Int. Cl.$^6$ .................................................. F24F 13/075
[52] U.S. Cl. ........................ 454/233; 454/256; 454/285; 454/315; 454/321
[58] Field of Search ................................... 454/202, 233, 454/234, 256, 285, 313, 315, 319, 320, 321

[56] References Cited

U.S. PATENT DOCUMENTS

| 4,890,545 | 1/1990 | Matsuda et al. | 454/256 |
| 4,926,293 | 5/1990 | Saba | 454/343 X |
| 5,478,276 | 12/1995 | Lee | 454/256 |

FOREIGN PATENT DOCUMENTS

| 58-85045 | 5/1983 | Japan | 454/256 |
| 62-56735 | 3/1987 | Japan | 454/256 |
| 4-52450 | 2/1992 | Japan | 454/256 |

*Primary Examiner*—Harold Joyce
*Attorney, Agent, or Firm*—Burns, Doane, Swecker & Mathis, L.L.P.

[57] ABSTRACT

An air conditioner includes a manual control panel for enabling a user to select from among a number of operating modes, including respective areas of a room to receive discharged air from the air conditioner. In accordance with the selected mode, there occurs an automatic adjustment of the orientation of air-directing vanes and the speed of an air discharge fan. The vanes can be adjusted to stationary positions, or can be oscillated.

5 Claims, 14 Drawing Sheets

FIG.12 (A)     FIG.12 (B)     FIG.12 (C)     FIG.12 (D)
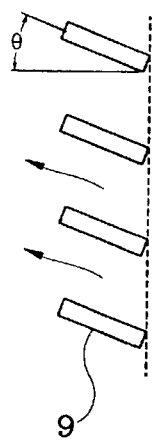 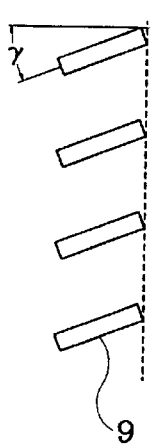 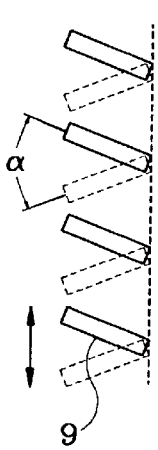 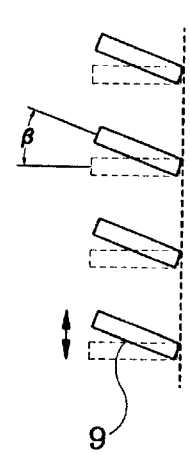

DISCHARGED AIR CURRENT CONTROL APPARATUS OF AIR CONDITIONER AND METHOD THEREOF

BACKGROUND OF THE INVENTION

1. Field of the Invention

The present invention relates to a discharged air current control apparatus of a room air conditioner and a method thereof by which the direction and speed of air discharged from the air conditioner are controlled.

2. Description of the Prior Art

An air conditioner according to the prior art is formed, as illustrated in FIG. 1, with an indoor body 1 having a lower suction grille member 5 employing a plurality of suction inlets 3 for sucking in room air. At an upper front side of the body 1, there is formed a discharging outlet 7 for discharging indoors the heat-exchanged air (i.e., cool air or warm air).

Furthermore, the suction inlet 7 is provided with vertical and horizontal vanes 11 and 9, respectively, for controlling the flow direction of air discharged indoors via the discharge outlet 7. The body 1 is fixed to a cover member 13 for forming a pleasing external appearance of the indoor unit and for protecting its contents therein.

The cover member 13 is provided with a manipulating unit (control panel) 15 for controlling an operation mode (automatic, cooling, dehumidifying, air blowing, heating and the like), operation start/stop, and amount and direction of air discharged via the discharge outlet 7.

Furthermore, behind the suction grille member 5 there is arranged, as illustrated in FIG. 2, a filtering member 17 for filtering-out foreign objects such as dust and the like floating in the room air sucked via the suction inlet 3. The filtering member 17 is disposed upstream of a heat exchanger 19 for exchanging heat with the filtered room air according to an evaporation latent heat of refrigerant.

The heat exchanger 19 is equipped at an upper part thereof with an indoor fan 23 which is rotated according to a drive of an indoor motor 21 so as to suck the room air via the suction inlet 3 and simultaneously to discharge indoors the heat-exchanged air via the discharge outlet 7.

The indoor fan 23 is encased within a duct member 25 for guiding the flow of the air to the discharge outlet 7.

In the air conditioner thus constructed, when a user manipulates a remote controller or the manipulating unit 15 to select a desired operation mode and to turn on an operation key, the indoor fan 23 is rotated by the indoor fan motor 21 to cause the room air to be sucked into the body 1 through the suction inlet 3.

Foreign objects such as dust and the like floating in the room air sucked into the suction inlet 3 are removed while they are passing through the filtering member 17, and the filtered room air is heat-exchanged by the evaporative latent heat of the refrigerant flowing in the heat exchanger 19 while it passes through the heat exchanger 19.

The air heat-exchanged by the heat exchanger 19 is guided upward by the duct member 25 to thereafter be discharged indoors via the discharge outlet 7, and the direction of air discharged through the discharge outlet 7 is adjusted to the left or to the right and up or down according to the angles of the vertical air direction vanes 11 and the horizontal air direction vanes 9.

At this time, whenever an operation key disposed at the manipulating unit 15 for controlling the position of the vanes 9 is turned on, the vanes 9 are rotated vertically, and whenever the key is turned off, the rotation of the vanes 9 is stopped.

Furthermore, when an operation key at the manipulating unit 15 for controlling the position of the vanes 11 is turned on, the vanes 11 are continuously swung horizontally, and when the key is turned on again, the swinging of the vanes 11 is stopped.

However, there is a problem in the conventional air conditioner thus constructed in that a user must visually ascertain positions of the vanes 9 and 11 and operate a key to seek a desired discharging air current pattern, causing an inconvenience to the user. Also, the air is discharged in a fixed direction according to the angles of the vanes 9 and 11 which means that the air current in the room is fixed, and areas not reached by the air current may not be adequately conditioned.

Thus, it would be necessary to make angle adjustments of the vanes 9 and 11 at predetermined intervals to air condition the entire room. Also, if an increased amount of air is needed for air conditioning a remote area of the room, the user must adjust not only the air current direction but also the air speed.

SUMMARY OF THE INVENTION

The present invention relates to an air conditioner comprising a body forming an air inlet for receiving air from a room, a heat exchanger disposed in the body for exchanging heat with the air, an air outlet formed by the body for discharging the heat exchanged air into the room, and air directing vanes disposed across the air outlet for controlling a flow direction of the discharged air. An orientation of the vanes is adjustable for varying the air flow direction. A variable speed fan is disposed in the body for circulating air from the inlet to the outlet and across the heat exchanger. An air flow control apparatus disposed on the body comprises a control panel, a control mechanism, and a display panel. The control panel includes manually actuable keys for selecting from among a plurality of air conditioning modes. The modes include respective areas of a room to which discharged air is to be supplied. The control mechanism is operably connected to the vanes and to the fan for automatically adjusting a fan speed and an orientation of the vanes in accordance with the selected mode. The display panel displays the selected air conditioning mode.

A method aspect of the invention involves actuating a variable speed fan for drawing room air into an air conditioner inlet, then passing the air across a heat exchanger, and then discharging the air through an air conditioner outlet to supply the discharged air to an area of the room determined by a speed of the fan and an orientation of adjustable vanes extending across the outlet. Respective keys are actuated on a manual control panel of the air conditioner for selecting an air conditioning mode from among a plurality of modes. The modes include respective areas of the room to be supplied with the discharged air. An automatic adjustment of fan speed and vane orientation is produced in accordance with the selected mode. The selected mode is visually displayed on a display panel.

In another method aspect of the invention, air is discharged into a room from an outlet of an air conditioner, with the direction and speed of the discharged air being adjustable. A manual control panel is actuated to select an area of the room to which the discharged air is to be supplied. In response to step A, a direction of discharged air flow is automatically adjusted to direct discharged air to the selected area. Also in response to step A, a speed of discharged air flow is automatically adjusted to propel discharged air to the selected area.

BRIEF DESCRIPTION OF THE DRAWINGS

For a fuller understanding of the nature and objects of the invention, reference should be made to the flowing detailed description taken in conjunction with the accompanying drawings in which:

FIGS. 12A–D are schematic diagrams illustrating various operational states horizontal air control vanes taken along line A—A in FIG. 1.

DETAILED DESCRIPTION OF PREFERRED EMBODIMENTS OF THE INVENTION

The preferred embodiment of the present invention will now be described in detail with reference to the accompanying drawings.

Figure 1:
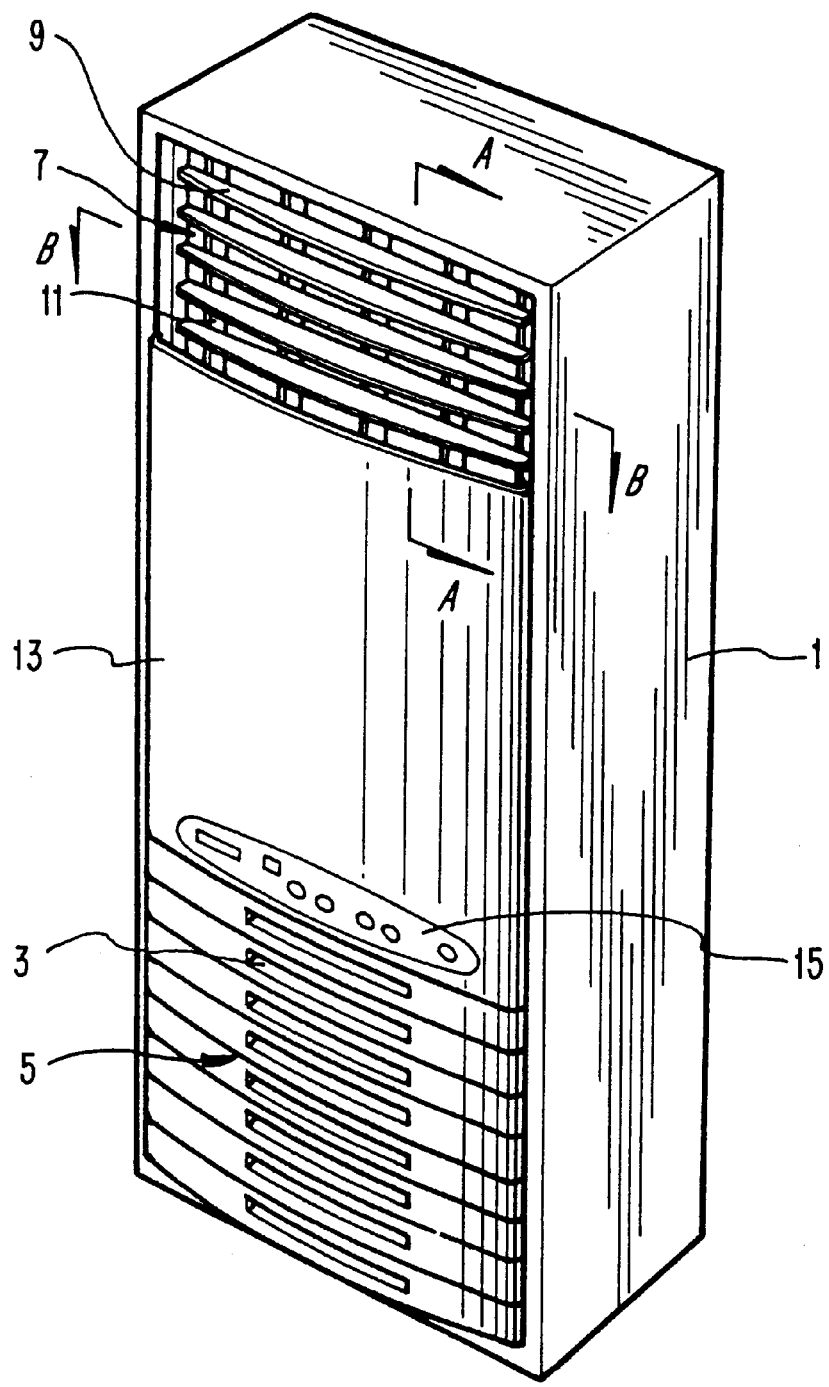
FIG. 1 is a front perspective view of an indoor unit of a conventional air conditioner.
Figure 2:
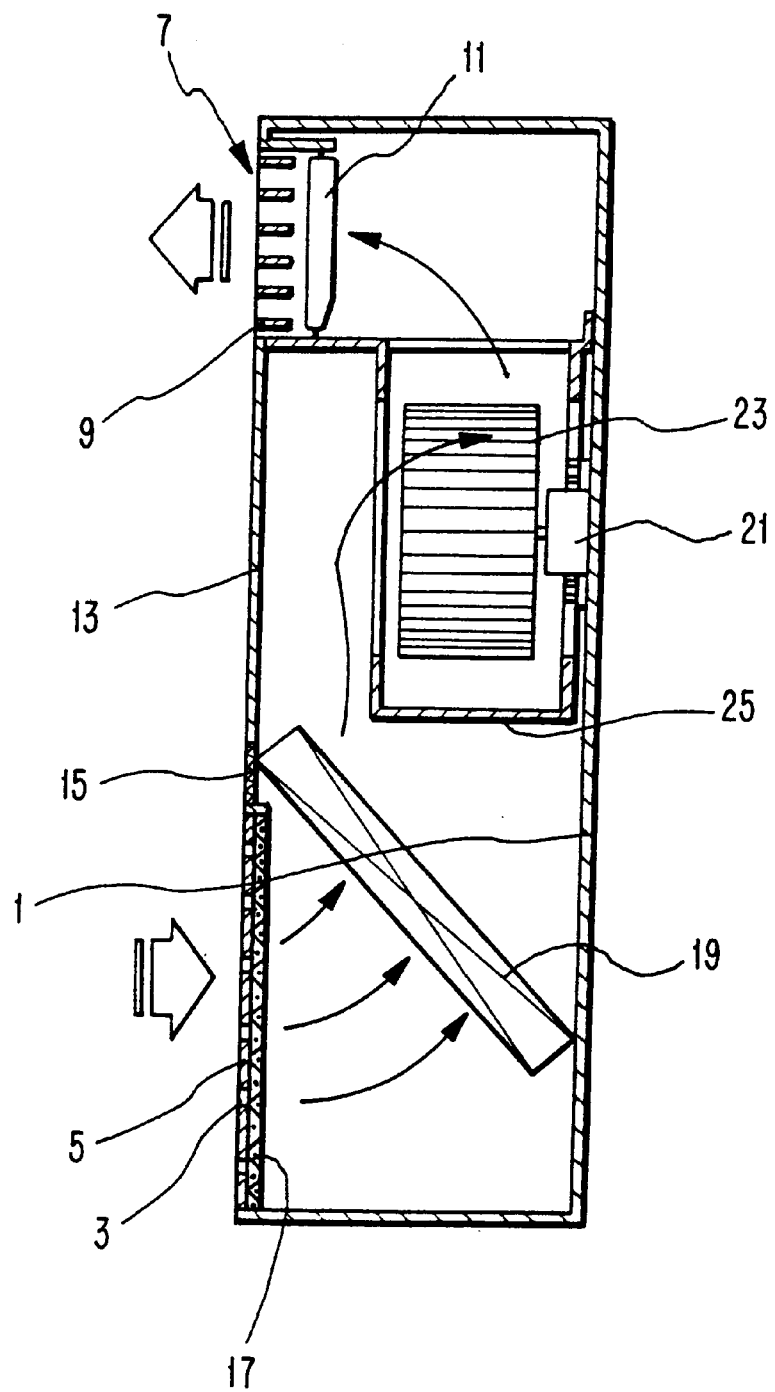
FIG. 2 is a vertical sectional view of FIG. 1.

Throughout the drawings, like reference numerals are used for designation of like or equivalent parts or portions as in FIGS. 1 and 2 for simplicity of illustration and explanation, and redundant reference will be omitted.

Figure 3:
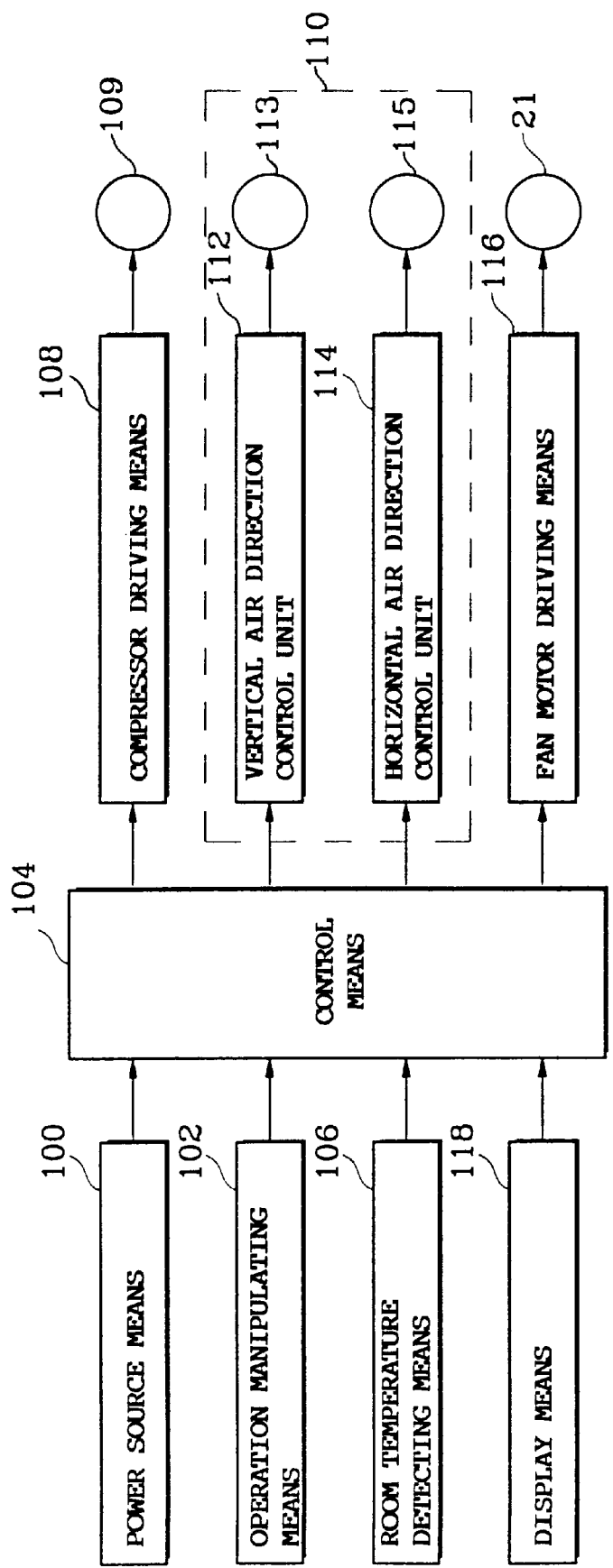
FIG. 3 is a control block diagram of a discharged air current control apparatus of an air conditioner according to the present invention.

As illustrated in FIG. 3, power source means 100 serves to convert AC voltage supplied from an AC power a commercial alternating current terminal (not shown) to a predetermined direct current DC voltage necessary for operation of the air conditioning and output same.

Operation manipulating means 102 is provided with a plurality of functional keys for inputting operational modes desired by a user (automatic, cooling, dehumidifying, blowing and heating), start/stop of the operation, set-up temperature (Ts), established air flow amount (fan speed) and established air direction of the discharged air. The means 102 includes a focus key (hereinafter referred to as short distance key) for adjusting directions and flow amount of the discharged air so that the discharged air can be concentratively supplied to a proximate area, that is, a short-distanced area from the body 1. A wide key is provided for adjusting the direction of the discharged air so that the discharged air can be evenly spread to wide areas in the entire room. A wave key is provided for adjusting the direction and flow amount of the discharged air so that the discharged air can reach a wide range of areas relatively moderately distanced from the body 1 (medium and far-distanced areas). A zoom key is provided for adjusting the direction and flow amount of the discharged air so that the discharged air can reach a remotely distanced area far from the body 1.

Control means 104 is a microcomputer which serves to receive a direct current DC voltage output from the power source means 100 to initialize the air conditioner and to control overall operations of the air conditioner according to an operation selecting signal and an operation start/stop signal input by the operation manipulating means 102, where the control means 104 controls air direction angles of the vertical vanes 11 and horizontal vanes 9, and the speed of the indoor fan 23.

Room temperature detecting means 106 serves to detect the room air temperature (Tr) so that the room temperature can be made to correspond to a temperature (Ts) established by a user according to the operation manipulating means 102.

Compressor driving means 108 serves to receive a control signal output from the control means 104 according to a difference between the temperature (Ts) established by the user according to the operation manipulating means 102 and the room temperature (Tr) detected by the room temperature detecting means 106, to controllably drive a compressor 109.

Furthermore, air direction control means 110 serves to control directions of the discharged air horizontally and vertically so that the air discharged via the discharge outlet 7 according to a key manipulation of the operation manipulating means 102 can be supplied to a short distanced area, a whole area of the room, a longdistanced area or a wide area (both medium and longdistanced), wherein the means 110 includes a control unit 112 for receiving the control signal output from the control means 104 to drive a motor 113 so that the horizontal vanes 9 can be moved up or down, and a control unit 114 for receiving the control signal output from the control means 104 to drive a motor 115 so that the vertical vanes 11 can be moved left or right.

Korean Application Serial No. P97-8013, or alternatively in U.S. Ser. No. 08/800,559, the disclosures of which are incorporated herein by reference.

Furthermore, fan motor driving means 116 is adapted to adjust the amount (speed) of the discharged air flow so that the air discharged via the discharge outlet 7 according to the key manipulation of the operation manipulating means 102 can be supplied to a short-distanced area, an entire area of the room, a long-distanced area and a wide area (central and long-distanced areas). That is accomplished when the driving means 116 receives a control signal output from the control means 104 to control the speed of the indoor fan motor 21 and thereby the speed of the indoor fan 23.

Display means 118 serves to receive the control signal output from the control means 104 according to the key signal input by the operation manipulating means 102 to display the selected operation modes (automatic, cooling, dehumidifying, blowing and heating), established temperature (Ts) and room temperature (Tr) and at the same time, turn on and turn off a short-dance display lamp for displaying a short-distance operation status, a wide display lamp for displaying a wide operation status, a wave display lamp for displaying a wave operation status or a long-distance display lamp for displaying a long-distance operation status.

Now, the operation of the discharged air current control apparatus of an air conditioner thus constructed will be described.

MODE SELECTION

Figure 4A:
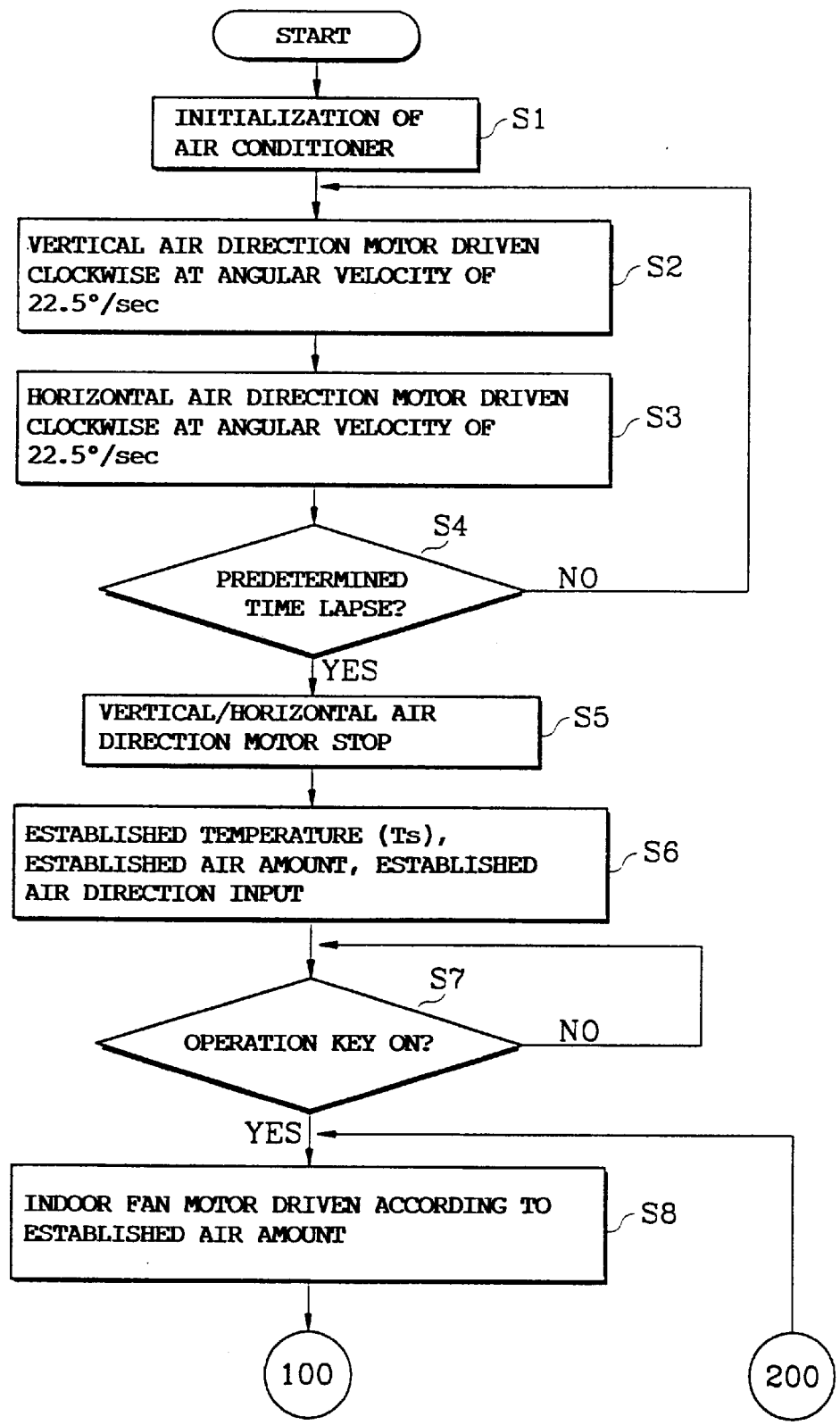
FIGS. 4A and 4B are flow charts illustrating a mode selection control operation procedure at an air conditioner according to the present invention.
Figure 4B:
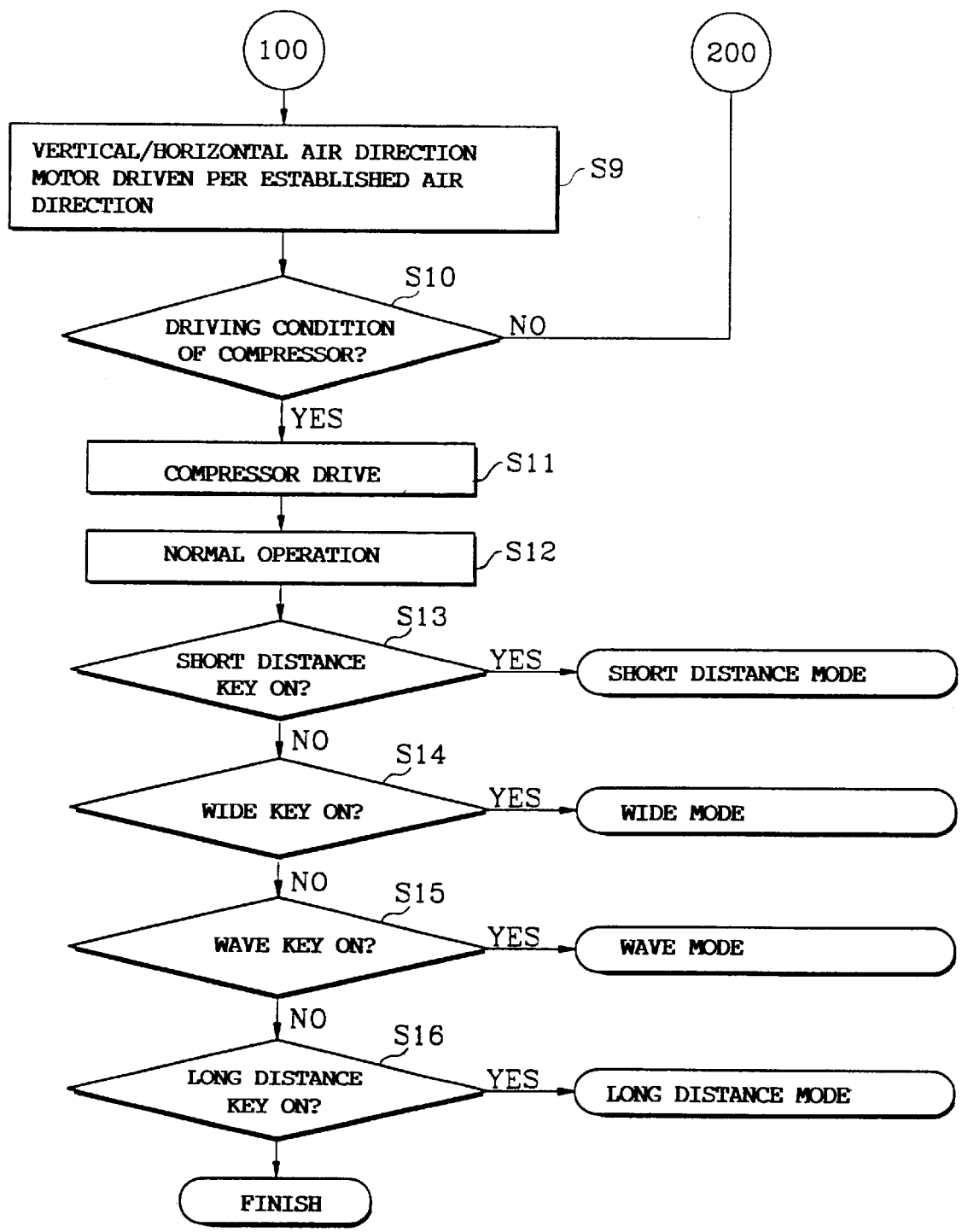

FIGS. 4A and 4B are flow charts for illustrating a mode selecting operational procedure of an air conditioner according to the present invention, where S defines steps.

When an electric power is applied to the air conditioner, the power source means 100 serves to convert the commercial AC voltage supplied from an AC power source terminal (not shown) to a predetermined DC voltage to thereafter output same to respective driving circuits and the control means 104.

At step S1, the DC voltage output from the power source means 100 is received by the control means 104 to thereafter initialize the air conditioner, and at step S2, the control means 104 outputs a control signal to the control unit 112 for driving the motor 113 at a speed of 22.5°/sec. so that the horizontal vanes 9 are moved to an original (closed) operation state where the outlet 7 is closed.

Then, at step S3, the control means 104 outputs a control signal to the control unit 114 for driving the motor 115 so that the vertical vanes 11 are moved at a speed of 22.5°/sec to an original (closed) operation point where the outlet 7 is closed.

At this time, at step S4, the control means 104 counts driving times of the motors 113 and 115 to discriminate whether a predetermined time (approximately 7 seconds) has lapsed, and if the predetermined time has not lapsed (in case of NO), it is discriminated that the vanes 9 and 11 are not completely closed and flow returns to step S2, and performs repeated operations subsequent to step S2 until the predetermined time lapses.

As a result of the discrimination at step S4, if the predetermined time has lapsed (in case of YES), it is discriminated the vanes 9 and 11 are all completely closed, so, flow proceeds to step S5, where the control units 112 and 114 stop the motors 113 and 115 according to the control of the control means 104 to terminate the closing operations of the vanes 9 and 11 and utilize this state as an original operation point thereafter.

Meanwhile, the initialized routine from step S2 to step S5 to shut the vanes 9, 11 is performed even when the air conditioner has been in an off state, because it is difficult to establish an exact position control if positions of vanes 9 and 11 have been changed by a random external manipulation thereof.

Successively, at step S6, the established temperature Ts of the room to be cooled or heated by the operation manipulating means 102, the established air flow amount and established air direction are input by the user to the control means 104. At step S7, a discrimination is made as to whether an operation/stop key (hereinafter to be referred as operation key) has been turned on, and if the operation key has not been turned on (in case of NO), the air conditioner is maintained at an operation stand-by status until the operation key is activated, and performs repeated operations subsequent to step S7.

As a result of the discrimination at step S7, if the operation key has been activated (in case of YES), flow advances to step S8 in order to perform a cooling or a heating operation because a manipulating command and an operation signal have been input to the control means 104 from the operation manipulating means 102, so the control means 104 outputs a control signal to fan motor driving means 116 in order to drive the indoor fan motor 21.

Successively, the fan motor driving means 116 receives the control signal output from the control means 104 corresponding to the established air flow amount input by the operation manipulating means 102 to control the speed of the indoor fan motor 21 as it drives the indoor fan motor 23.

When the indoor fan 23 is driven according to the established air flow amount, the room air is sucked into the body 1 through the suction inlet 3, and the temperature of the room air sucked through the suction inlet 3 is detected by room temperature detecting means 106 which in turn outputs a signal to the control means 104.

Successively, at step S9, the control means 104 outputs to the control units 112 and 114 a control signal for driving the vertical and horizontal air direction motors 113 and 115 so that the air direction angles of the vanes 9 and 11 can be adjusted according to the established air direction input by the operation manipulating means 102.

Successively, at step S10, a comparison is made between the room temperature (Tr) detected by the room temperature detecting means 106 and the temperature (Ts) established by the user at the operation manipulating means 102 to thereafter discriminate whether the compared result meets a driving condition of compressor 109.

At this time, the driving condition of the compressor 9 represents a case where the room temperature (Tr) is larger than the established temperature (Ts) during a cooling operation mode, and a case where the room temperature (Tr) is smaller than the established temperature (Ts) during a heating operation mode. The present invention describes a cooling or heating operation as an example.

As a result of the discrimination at step S10, if the result does not correspond to a driving condition of the compressor 109 (in case of NO), flow returns to step S8, and keeps monitoring the room temperature (Tr) and performs repeated operations subsequent to step S8.

If the result meets the driving condition of the compressor 109 (in case of YES), flow proceeds to step S11, where the control means 104 determines an operation frequency of the compressor 109 according to a difference between the room temperature (Tr) and the established temperature (Ts) to output a control signal to compressor driving means 108 for driving the compressor 109.

Accordingly, the compressor driving means 108 drives the compressor 109 according to the operation frequency determined by the control means 104.

When the compressor 109 is activated, and the indoor fan 23 is being driven, step S12, the room air is sucked into the body 1 through the suction inlet 3, and foreign objects such as dust floating in the room air are eliminated in the course of passing through filtering member 7.

The filtered room air passes through the heat exchanger 19 and is heat-exchanged by evaporative latent heat of the refrigerant flowing in the heat exchanger 19.

The air heat-exchanged by the heat exchanger 19 is moved upward through the duct member 25 and a discharge direction thereof is horizontally or vertically adjusted according to the air direction angles of the vanes 9 and 11.

During the normal operation of the air conditioner as described above, a discrimination is made as to whether a short-distance (focus) key at the operation manipulating means 102 is activated, step S13, and if the key is turned on (in case of YES), the control means 104 enters a shortdistance mode for concentrating the air conditioning at an area in the room near to the body 1.

As a result of the discrimination at step S13, if the short distance key has not been rendered operative, flow advances to step S14, to discriminate if a wide key at the operation manipulating means 102 has been rendered operative.

If the wide key has been rendered operative (in case of YES), the control means 104 enters a wide mode for evenly air conditioning the entire room.

As a result of the discrimination at step S14, if the wide key has not been turned on (in case of NO), flow proceeds to step S15 to discriminate if a wave key at the operation manipulating means 102 has been turned on.

If the wave key has been turned on (in case of YES), the control means 104 enters a wave mode for air conditioning a wide area of the room (central and long distanced area) relatively distanced from the body 1.

As a result of the discrimination at step S15, if the wave key has not been rendered active (in case of NO), flow advances to step S16, thereby discriminating if a zoom key at the operation manipulating means 102 has been turned active.

If the zoom key has been rendered operative (in case of YES), the control means 104 enters a long distance mode for air conditioning an area (a long distanced area) far from the body 1.

As a result of the discrimination at step S16, if the zoom key has not been rendered operative (in case of NO), flow returns to step S12 and executes a normal operation and performs repeated operations subsequent to step S12.

SHORT DISTANCE MODE

Next, air current control operations under the short distance mode, wide mode, wave mode and long-distanced mode will be described with reference to FIGS. 5 through 11.

Figure 5:
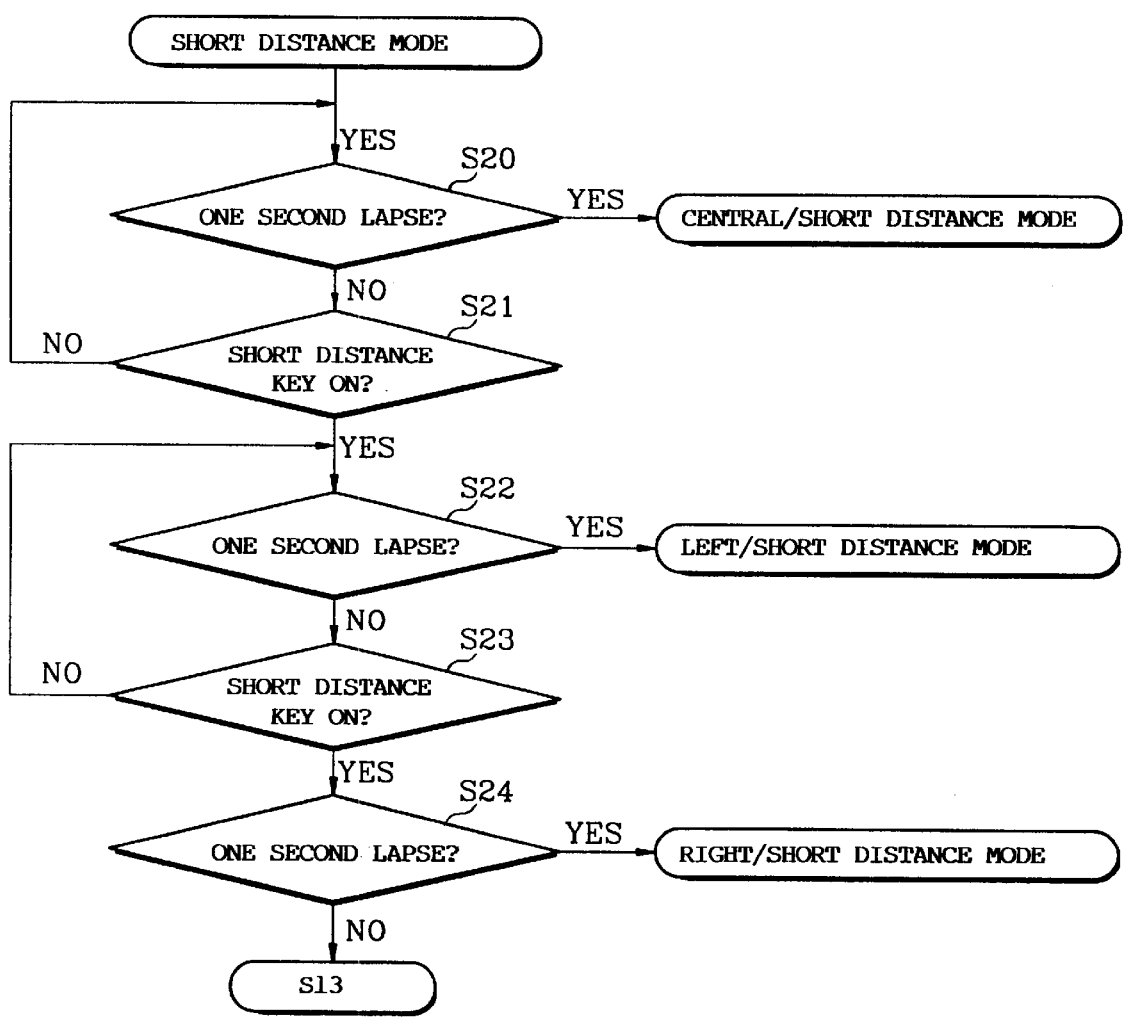
FIG. 5 is a flow chart illustrating a mode selection control operation procedure for a short-distance mode according to the present invention.

First of all, a control operation of the short-distance mode will be described with reference to FIG. 5.

When an air conditioner operates under a short-distance mode due to the focus key being rendered operative (i.e., a first actuation thereof), the control means 104 discriminates, at step S20, whether a period of one second has lapsed after the short distance (focus) key has been rendered operative.

If the period of one second has lapsed (in case of YES), the control means 104 enters a central/short distance (focus) mode for concentrating the air conditioning in central area of the room near to the body.

As a result of discrimination at step S20, if the one second period has not lapsed (in case of NO), flow proceeds to step S21, and discriminates whether the short distance key has been again rendered operative (i.e., a second actuation thereof) within the one second period.

If the short distance key has not been rendered operative (in case of NO), flow returns to step S20 and executes repeated operations subsequent to step S20 until the one second period lapses.

As a result of the discrimination at step S21, if the short distance key has been turned on a second time (in case of YES), flow advances to step S22, where the control means 104 discriminates whether the one second period has lapsed after the short distance key has been turned on a second time.

If the one second period has lapsed (in case of YES), the control means 104 enters a left short distance (focus) mode for concentratively air conditioning a left area of the room near to the body 1.

As a result of the discrimination at step S22, if the one second period has not lapsed (in case of NO), flow advances to step S23, and discriminates whether the short distance key has been turned on for a third time within a second after the short distance key was rendered active the second time.

If the short distance key has not been rendered operative (in case of NO), flow returns to step S22, and executes repeated operations subsequent to step S22 until the one second lapses.

As a result of the discrimination at step S23, if the short distance key has been rendered operative (in case of YES), flow proceeds to step S24, where the control means 104 discriminates whether one second has lapsed after the short distance key was turned on for the third time.

If the one second has lapsed (in case of YES), the control means 104 enters a right short distance (focus) mode for concentratively air conditioning a right side area of the room near to the body 1.

As a result of the discrimination at step S24, if the one second period has not lapsed (in case of NO), flow returns to step S13 and executes repeated operations subsequent to step S13.

CENTRAL SHORT DISTANCE MODE

Figure 6:
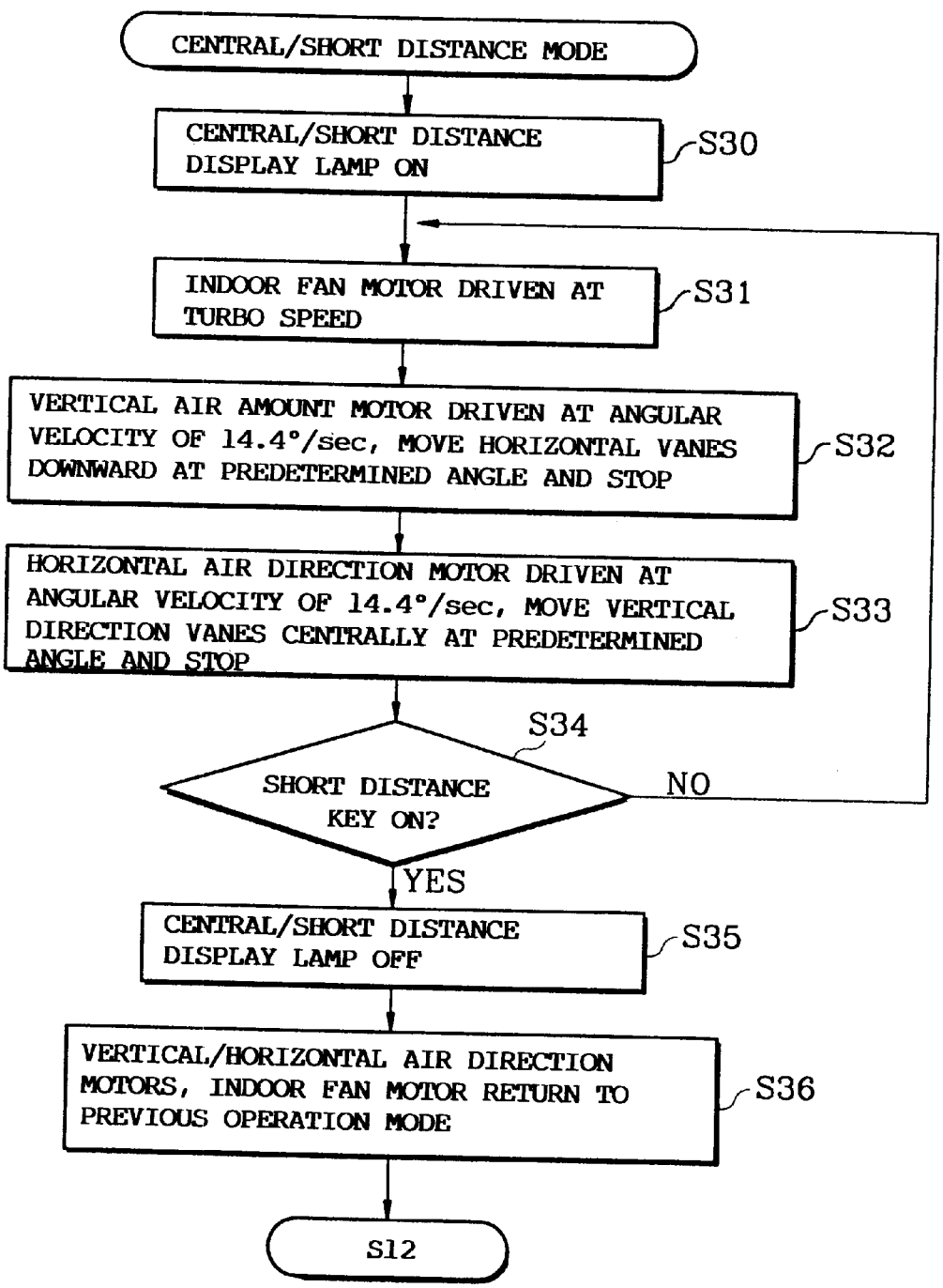
FIG. 6 is a flow chart illustrating a discharged air current control procedure for a center/short distance mode according to the present invention.
Figure 7:
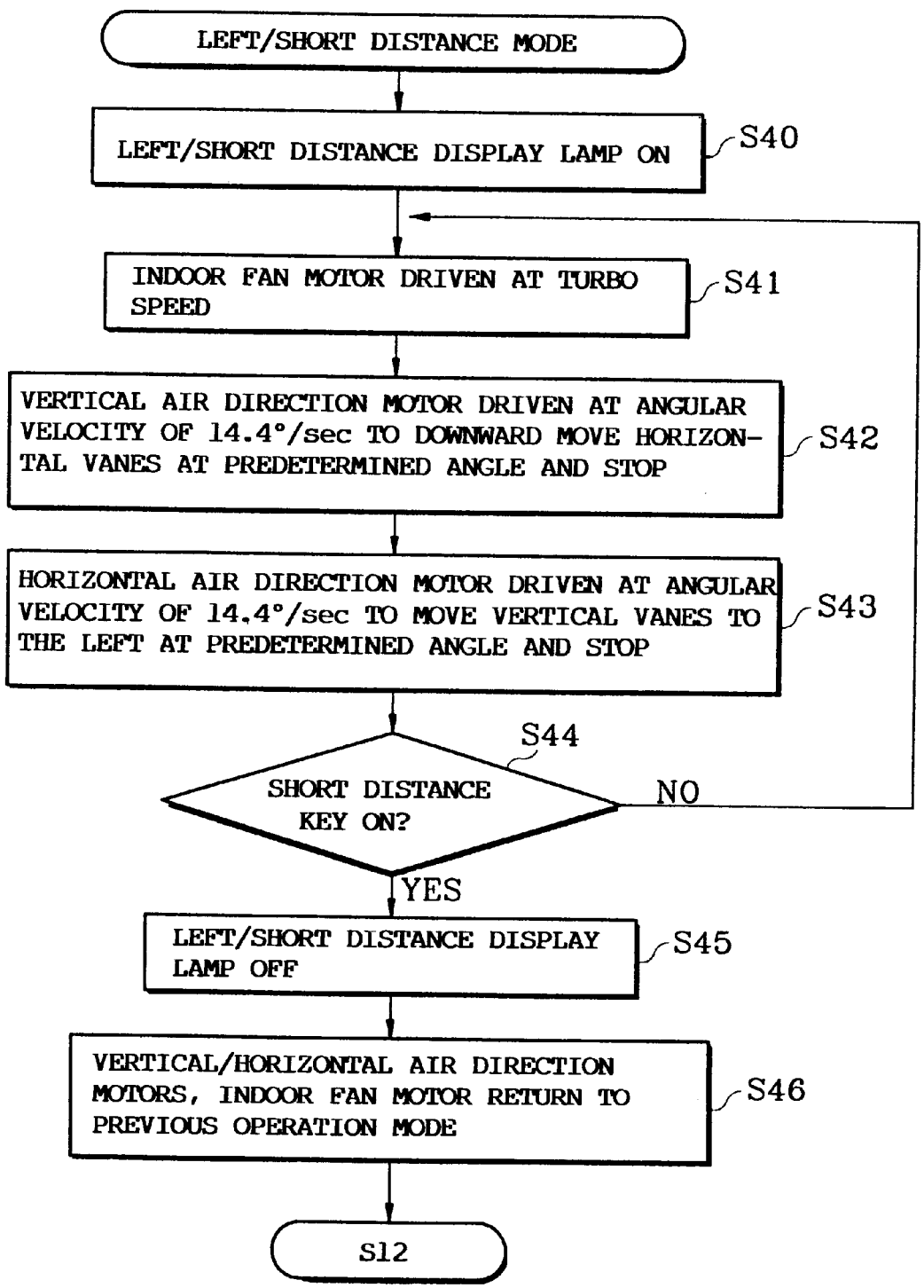
FIG. 7 is a flow chart illustrating a discharged air current control operation procedure for a left/short distance mode according to the present invention.
Figure 8:
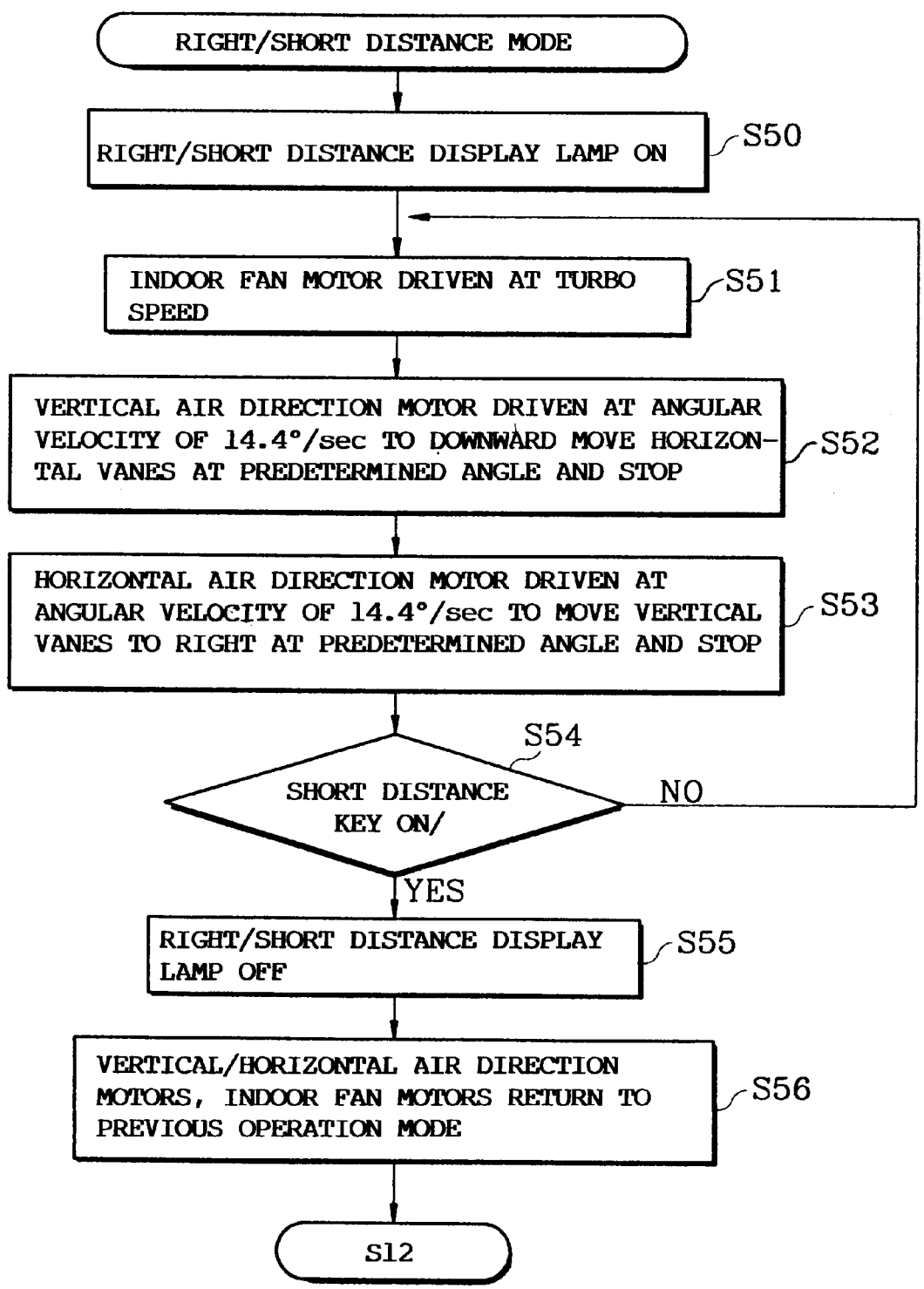
FIG. 8 is a flow chart illustrating a discharged air current control operation procedure for a right/short distance mode according to the present invention.

Next, air current control operations of a central short distance mode, left short distance mode and a right short distance mode according to the operation modes selected in the above description will be described with reference to FIGS. 6 through 8.

To begin with, a central short distance mode will be described with reference to FIG. 6.

When an air conditioner enters the central short distance mode due to the short distance (focus) key being made operative only one time, the control means 104 at step S30 outputs a control signal to display means 18 for displaying a central short distance operational state of the air conditioner.

Successively, the display means 118 turns on a central short distance display lamp according to a control of the control means 104 to thereby display a central short distance operational state.

The control means 104, at step S31, outputs a control signal to the fan motor driving means 116 for driving the indoor fan motor 21 so that air is discharged through the discharge outlet 7.

Successively, the fan motor driving means 116 receives a control signal output from the control means 104 to drive the indoor fan motor 21 at a turbo speed (approximately 670 rpm), and at step S32, the control means 104 outputs a control signal to the control unit 112 to adjust angles of the horizontal vanes 9 so that the discharged air can be concentrated near the body 1.

Then, the motor 113 is driven at an angular velocity of 14.4°/sec and moves the horizontal vanes 9 downwardly by a predetermined angle γ of approximately 15°, as illustrated in FIG. 12B, whereupon the motor 113 stops.

Successively, the control means 104 at step S33 outputs a control signal to the control unit 114 to adjust angles of the vertical vanes 11 so that the discharged air can be concentrated at the central area of the room.

Figure 13:
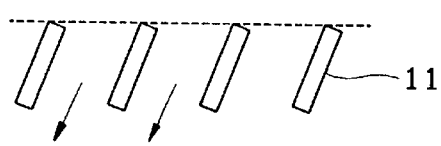
FIGS. 13A–E are schematic diagrams illustrating various operational states of vertical air control vanes taken along line B—B in FIG. 1.
Figure 13:
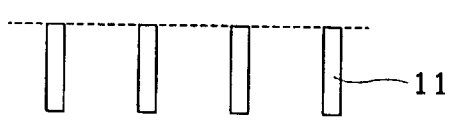
Figure 13:
Figure 13:
Figure 13:
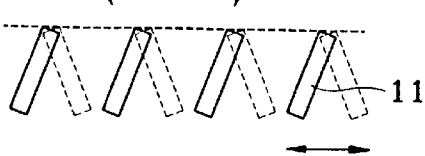

The control unit 114 receives the control signal output from the control means 104 to drive the motor 115 at an angular velocity of 14.4°/sec, so that some of the vertical vanes 11A are tilted to the left at a predetermined angle (approximately 15 degrees), and the rest of the vanes 11B are tilted to the right at a predetermined angle (approximately 15 degrees), as illustrated in FIG. 13D, whereupon the motor 115 stops.

Successively, the room air sucked-through the suction inlet 3 is heat-exchanged by evaporative latent heat of the refrigerant flowing in the heat exchanger 19, and the air is moved upward through the duct member 25.

The discharged air is concentrated at the central proximate position of the room according to the stationary horizontal vanes 9 directed downwards and the stationary vertical vanes 11 directed to converge.

The air discharged according to the turbo drive of the indoor fan motor 21 is thereby concentrated at a central/short-distanced area.

At this time, a discrimination is made as to whether the short distance key has been re-actuated during the central/ short distance mode. If not (in case of NO), flow returns to step S31 and executes repeated operations subsequent to step S31.

As a result of the discrimination at step S34, if the short distance key has been re-actuated (in case of YES), flow proceeds to step S35 to stop the central and short-distanced area operation of the air conditioner because a stop signal is input from the operation manipulating means 102 to the control means 104, which causes the display means 118 to deactivate the central/short distance display lamp.

The motors 113 and 115, and the indoor fan motor 21 return, at step S36, to a cooling or heating operation mode which was established prior to the selection of the central/short mode and keep executing that operation at step S12 and perform repeated operations subsequent to step S12.

LEFT SHORT DISTANCE MODE

Next, a control operation of left short distance mode will be described with reference to FIG. 7.

If the short distance (focus) key has been turned on twice to cause the air conditioner to enter the left short distance mode (step S22), the control means 104 outputs a control signal for displaying a left short distance operation state of the air conditioner to the display means 118.

Successively, the display means 118 turns on a left short distance display lamp according to the control of the control means 104 to thereby display the left short distance operation state.

The control means 104 outputs at step S41 to the fan motor driving means 116 a control signal for driving the indoor fan motor 21 so that air can be discharged through the discharge outlet 7.

The fan motor driving means 116 receives the control signal of the means 104 to drive the indoor fan motor 21 at the afore-mentioned turbo speed, and at step S42, the control means 104 outputs to the control unit 112 a control signal for adjusting the vanes 9 so that the air can be concentrated near the body 1.

The control unit 112 receives a control signal output from the control means 104 to drive the motor 113 at an angular velocity of 14.4°/sec, which tilts downwards the horizontal vanes 9 to a predetermined angle (approximately 15 degrees) as illustrated in FIG. 12B, and then the motor 113 stops.

At step S43, the control means 104 outputs to the control unit 114 a control signal for adjusting the angle of the vertical vanes 11 so that the discharged air is concentrated at the left side of the room.

The control unit 114 receives the control signal output from the control means 104 and drives the motor 115 at an angular velocity of 14.4°/sec, so that the vertical vanes 11 are tilted to the left at a predetermined angle (approximately 15 degrees), as illustrated in FIG. 13A, and then the motor 115 stops.

The discharged air is then concentrated to the left of the room, near to the body 1, due to the stationary blades 9 being directed downwardly, and the stationary blades 11 tilted toward the left.

At this time, a discrimination is made at step S44 as to whether the short distance key has been reactivated during the left/short distance mode. If not (in case of NO), flow returns to step S41 to thereafter execute repeated operations subsequent to step S41.

As a result of the discrimination at step S44, if the short distance key has been reactivated (in case of YES), flow advances to step S45 to stop the left/short distance operation of the air conditioner.

Then, the display means 118 turns off the left short distance display lamp according to the control of the control means.

At step S46, the motors 113 and 115, and the indoor fan motor 21 return to a cooling or heating operation mode which was established prior to the selection of the left short distance mode. That prior mode is performed at step S12 and operations subsequent to step S12 are repeated.

RIGHT SHORT DISTANCE MODE

Next, a control operation of right short distance mode will be described with reference to FIG. 8.

If the short distance key was actuated three times (step S24), the air conditioner enters a right short distance mode, where the control means 104 outputs to the display means 118 a control signal for displaying a right short distance operation state of the air conditioner, step S50.

At step S51, the control means 104 outputs to the fan motor driving means 116 a control signal for driving the indoor fan motor 21 at the turbo speed.

At step S52, the control means 104 outputs to the control unit 112 a control signal for adjusting angles of the horizontal vanes 9 so that the discharged air is concentrated near the body 1.

Successively, the control unit 112 receives the control signal of the control means 104 to drive the motor 113 at an angular velocity of 14.4°/sec to tilt downwards the vanes 9 to a predetermined angle (as shown in FIG. 12B, approximately 15 degrees), and then the motor 113 stops.

At step S53, the control means 104 generates to the control unit 114 a control signal for adjusting angles of the vanes 11, thereby causing the discharged air to be concentrated to the right.

The control unit 114 drives the motor 115 at an angular velocity of 14.4°/sec so that the vanes 11 are tilted to the right at a predetermined angle (approximately 15 degrees), as illustrated in FIG. 13C, and then the motor 115 stops.

Successively, the discharged air is concentrated at the right side of the room near to the body 1, due to the vanes 9 being tilted downwardly, and the vanes 11 being tilted to the right.

At this time, a discrimination is made at step S54 as to whether the short distance key has been reactivated during the right short distance operation. If not (in case of NO), flow returns to step S51 and performs repeated operations subsequent to step S51.

As a result of the discrimination at step S54, if the short distance key has been re-actuated (in case of YES), flow advances to step S55 to stop the right short distance operation. Then, the display means 118 turns off the right short distance display lamp. At step S56, motors 113 and 115 and the indoor fan motor 21 return to a cooling or heating operation mode established prior to the selection of the right short distance mode (step S12) and repeats operations subsequent to step S12.

WIDE MODE

Figure 9A:
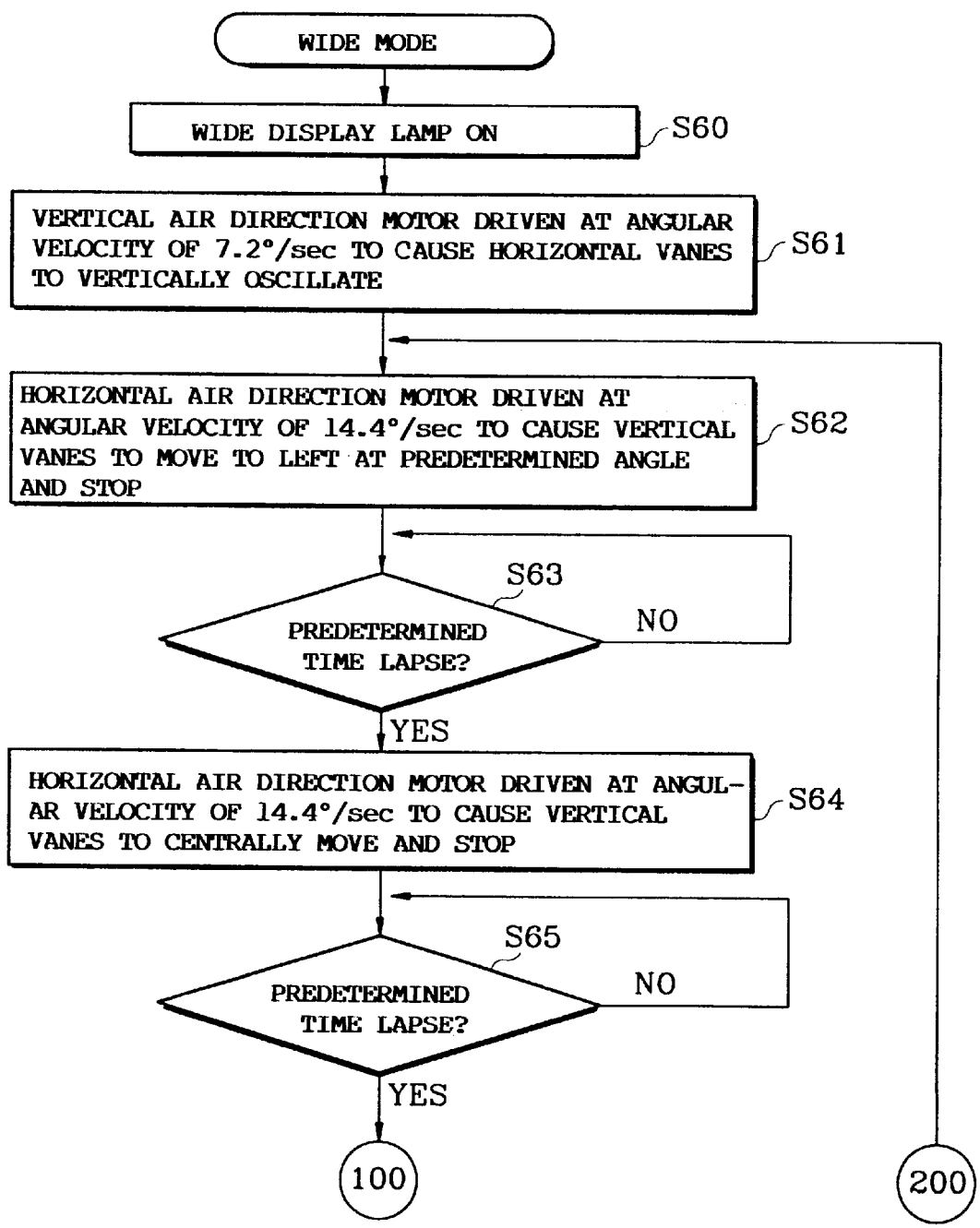
FIGS. 9A and 9B are flow charts illustrating discharged air current control operation procedure for a "wide" mode according to the present invention.
Figure 9B:
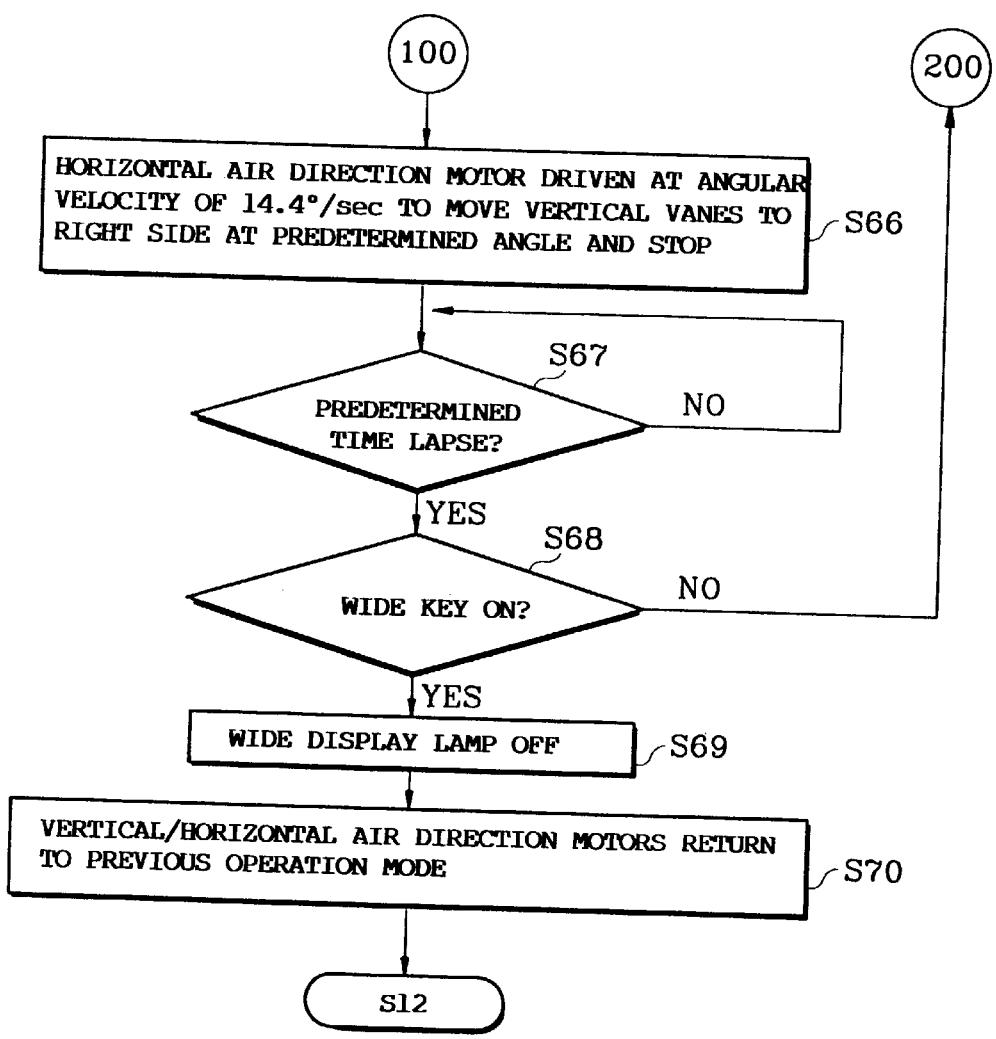

Next, a control operation of the wide mode will be described with reference to FIGS. 9A and 9B.

When an air conditioner enters a wide mode in response to the wide key being actuated (step S14), the control means 104 generates to the display means 118 a control signal for displaying a wide operation state of the air conditioner.

Successively, the display means 118 turns on a wide display lamp to thereby display a wide operation state.

The user selects a desired fan speed (e.g., turbo speed or different from turbo speed).

At step S61, the control means 104 outputs a control signal to the control unit 112 to drive the motor 113 at an angular velocity of 7.2°/sec, so that the vanes 9 oscillate in a predetermined vertical angle $\alpha$ of approximately 30 degrees as illustrated in FIG. 12C.

At step S62, the control means 104 generates to the control unit 114 a control signal for adjusting the angles of the vertical vanes 11 so that the discharged air can be evenly and widely spread to the entire area of the room.

The control unit 114 receives the control signal output from the control means 104 to thereby drive the motor 115 at an angular velocity of 14.4°/sec to tilt the vanes 11 at a predetermined angle (approximately 15 degrees) to the left as illustrated in FIG. 13C, whereupon the motor 115 stops.

At this time, at step S63, the control means 104 counts a time period at which the vanes 11 are fixed at the predetermined angle to the left, and discriminates whether a predetermined time period (approximately 20 seconds) has lapsed. If the predetermined time has not lapsed (in case of NO), operations are repeated subsequent to step S63 until the predetermined time period lapses.

As a result of the discrimination at step S63, if the predetermined time period has lapsed (in case of YES), flow advances to step S64, where the control unit 114 drives the motor 115 at an angular velocity of 14.4°/sec according to the control of the control means 104 to thereby tilt the vanes 11 to a central or straight-ahead position as illustrated in FIG. 13B, whereupon the motor 115 stops.

At step S65, the control means 104 discriminates whether the time period at which the vanes 11 are fixed in the straight-ahead position has passed the predetermined time period (approximately 20 seconds), and if not (in case of NO), operations are repeated subsequent to step S65 until the predetermined time period lapses.

As a result of the discrimination at step S65, if the predetermined time period has lapsed (in case of YES) flow proceeds to step S66, where the control unit 114 drives the motor 115 at an angular velocity of 14.4°/sec according to the control of the control means 104 and tilts the vanes 11 to the right at a predetermined angle (approximately 15 degrees) as illustrated in FIG. 13A, whereupon the motor 115 stops.

At step S67, the control means 104 discriminates whether the time period at which the vanes 11 are directed to the right has passed the predetermined time period (approximately 20 seconds) and if the predetermined time period has not lapsed (in case of NO), operations are repeated subsequent to step S67 until the predetermined time lapses.

As a result of the discrimination at step S67, if the predetermined time period has lapsed (in case of YES), flow advances to step S68, to discriminate whether the wide key has been reactuated during the wide mode. If not, (in case of NO), flow returns to step S62 to thereby perform repeated operations subsequent to step S62.

During the wide mode, the discharged air current is evenly and widely spread to the entire area of the room to thereby perform a wide range of air conditioning, wherein there occurs a continuous oscillation of the vanes 9 and a periodic tilting of the vanes 11 between right, straight ahead and left directions.

As a result of the discrimination at step S68, if the wide key has been reactuated (in case of YES), flow proceeds to step S69 to stop the wide operation of the air conditioner.

Then, the display means 118 turns off the wide display lamp according to the control of the control means 104. At step S70, the motors 113 and 115 return to a cooling or heating operation mode established prior to the wide mode, and continue performing that operation at step S12 and repeat operations subsequent to step S12.

Figure 10:
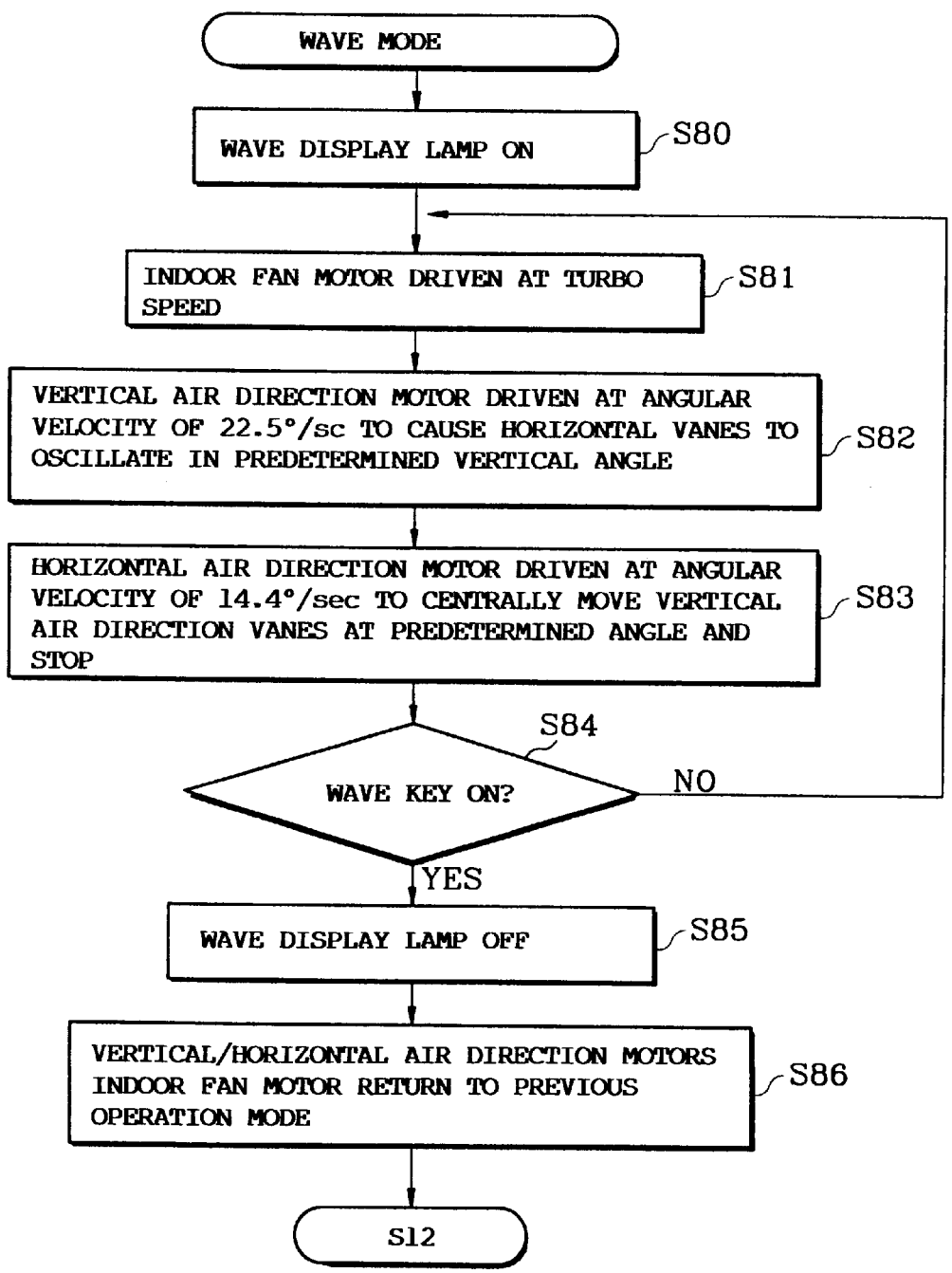
FIG. 10 is a flow chart illustrating a discharged air current control operation procedure for a "wave" mode according to the present invention.

Next, a wave mode control operation will be described with reference to FIG. 10.

When the wave mode is entered according to activation of the wave key (step S15), the control means 104 outputs to the display means 118 a control signal for displaying a wave operation state of the air conditioner, step S80.

Then, the display means 118 turns on a wave display lamp according to the control of the control means 104 to thereby display a wave operation status, and at step S81, the control means 104 supplies to the fan motor driving means 116 a control signal for driving the indoor fan motor 21.

When the fan motor driving means 116 receives the control signal output from the control means 104 it drives the indoor fan motor 21 at the turbo speed.

At step S82, the control means 104 supplies to the control unit 112 a control signal for adjusting angles of the vanes 9 so that the discharged air can reach a wide area (medium and long-distanced areas).

Successively, the control unit 112 receives the control signal output from the control means 104 to thereby drive the motor 113 at an angular velocity of 22.5°/sec to cause the vanes 9 to be continuously oscillated in a predetermined vertical angle β of approximately 15 degrees as illustrated in FIG. 12D.

At step S83, the control means 104 outputs to the control unit 114 a control signal for adjusting angles of the vanes 11 so that the discharged air can reach a wide area (medium and long-distanced area).

The horizontal air direction control unit 114 receives the control signal output from the control means 104 to drive the motor 115 at an angular velocity of 14.4°/sec to tilt the vanes 11 to a predetermined central angle as illustrated in FIG. 13D, whereupon the motor 115 stops. Thus, some of the vanes 11A are directed to the right and the rest 11b to the left.

The air discharge direction is defined by the vertically oscillating blades 9 and the stationary blades The discharged air now reaches a wide area (at both medium and long-distanced areas) relatively distanced from the body 1 to enable an air conditioning to be performed over a wide area.

At this time, at step S84, a discrimination is made as to whether the wave key has been reactuated during the wave mode. If not (in case of NO), flow returns to step S81, and repeats operations subsequent to step S81.

As a result of the discrimination at step S84, if the wave key has been reactuated (in case of YES), flow proceeds to step S85 to stop the wave operation of the air conditioner. Then, the display means 119 turns off the wave display lamp according to the control of the control means 104.

At step S86, the motors 113 and 115, and the indoor fan motor 21 return to a cooling or heating operation mode previously established prior to the selection of the wave mode and performs continuously the normal operation at step S21 and executes repeated operations subsequent to step S12.

LONG DISTANCE MODE

Figure 11:
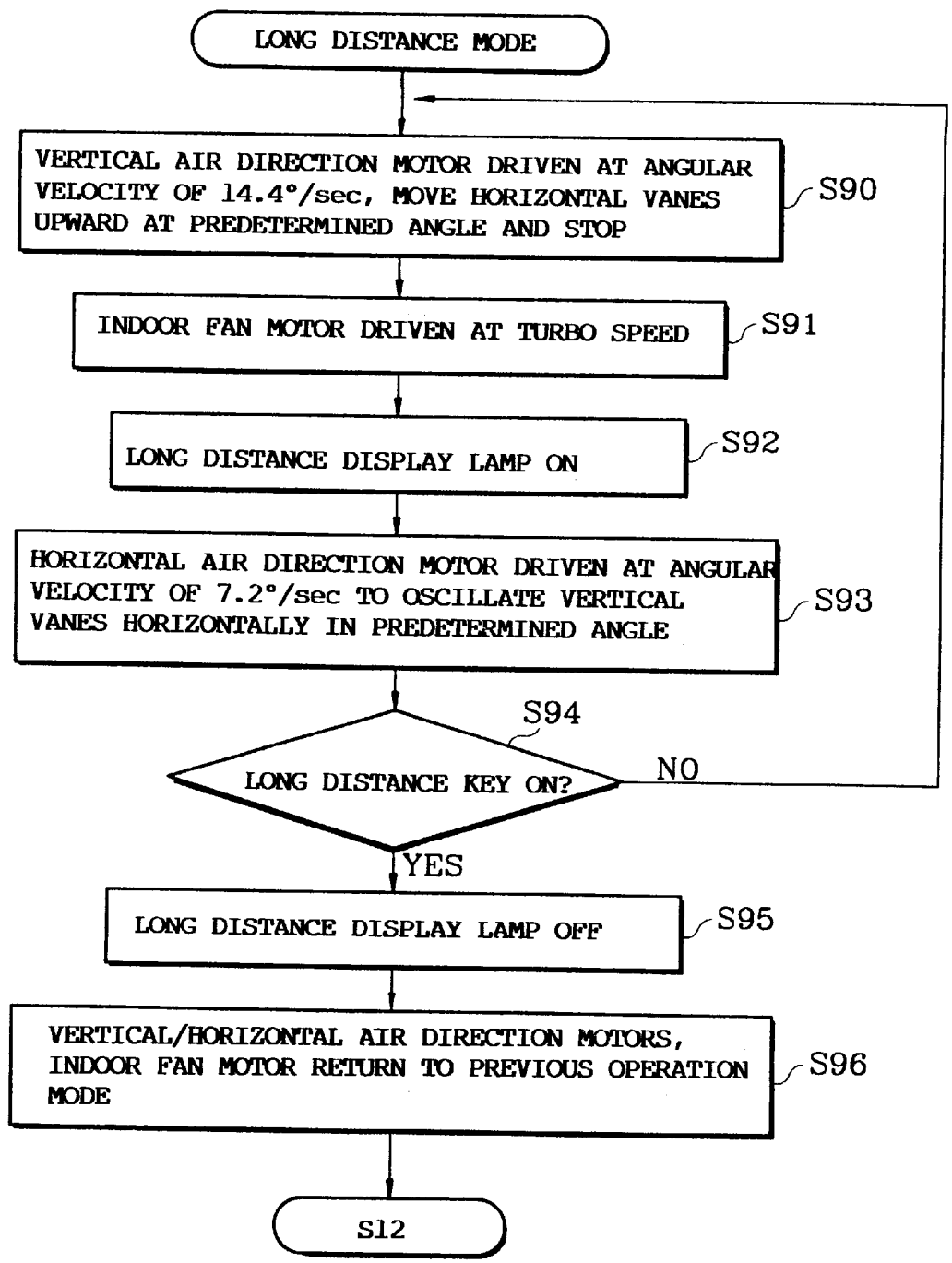
FIG. 11 is a flow chart illustrating a discharged air current control operation procedure for a long distance mode according to the present invention.

Next, a long distance mode control operation will be described with reference to FIG. 11.

When the air conditioner enters the long distance mode according to the activation of a long distance (zoom) key (step S16), the control means 104 supplies to the vertical air direction control unit 112 a control signal for adjusting the angles of the vanes 9 so that the air discharged via the discharge outlet 7 can reach a long-distanced area far remote from the body 1, step S90.

Successively, the control unit 112 receives the control signal generated from the control means 104 to drive the motor 113 at an angular velocity of 14.4°/sec to tilt upwards the vanes 9 to a predetermined angle θ as illustrated in FIG. 12A, whereupon the motor 113 stops.

At step S91, the control means 104 supplies to the fan motor driving means 116 a control signal for driving the indoor fan motor 21 so that the discharged air can reach a long distance area.

The fan motor driving means 116 receives the control signal generated from the control means 104 to thereby cause the indoor fan motor 21 to be driven at the turbo speed.

At step S92, the control means 104 outputs to the display means 118 a control signal for displaying a long distance operation status of the air conditioner.

Successively, the display means 118 turns on a long distance display lamp according to the control of the control means 104 to thereby display a long distance operation status.

At step S93, the control means 104 outputs to the control unit 114 a control signal for adjusting the angles of the vanes 11 to cause the discharged air to reach a long-distanced area.

The control unit 114 receives the control signal generated from the control means 104 to thereby drive the motor 115 at an angular velocity of 7.2°/sec by which the vanes 11 are oscillated within a predetermined horizontal angle of approximately 30 degrees as illustrated in FIG. 13E.

The discharged air direction is defined by the stationary upwardly tilted vanes 9 and the continuously oscillating vanes 11 to achieve a long distance air conditioning.

Successively at step S94, a discrimination is made as to whether the long distance key has been reactuated during the long distance mode. If not (in case of NO), flow returns to step S90 and executes repeated operations subsequent to step S90.

As a result of the discrimination at step S94, if the long distance key has been reactuated (in case of YES), flow proceeds to step S95 to stop the long distance operation of the air conditioner. Then, the display means 118 turns off the long distance display lamp according to the control of the control means 104.

At step S96, the motors 113 and 115, and the indoor fan motor 21 return to a cooling or heating operation mode previously established prior to the selection of the long distance mode, and keep performing a normal operation at step S12 and thereafter execute repeated operations subsequent to step S12.

As is apparent from the foregoing, there is an advantage in the discharged air current control apparatus of an air conditioner and a method thereof according to the present invention, in that a direction and an amount of discharged air can be adjusted according to a simple key manipulation to thereby increase the air conditioning effect of an entire room.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A method of controlling a flow direction of air discharged from an air outlet of an air conditioner into a room, the air conditioner comprising a suction inlet for sucking indoor air, a heat exchanger for heat-exchanging said indoor air sucked through said suction inlet, a discharge outlet for discharging the air heat-exchanged in said heat exchanger, a plurality of adjustable horizontal blades and adjustable vertical blades for controlling a wind direction of the air discharged through said discharge outlet, a variable-speed indoor fan for controlling a wind amount of the air discharged through said discharge outlet, and an operation mode selector for enabling a user to choose a room area to be air conditioned, the operation mode selector providing a choice of room areas and including a short distance mode for air conditioning an area located proximate to the air conditioner, a wide mode for air conditioning wide areas located proximate to and distant from the air conditioner, a wave mode for air conditioning an area located distant from the air conditioner, and a long distance mode for air conditioning a wide area located distant from the air conditioner, the method comprising the steps of:

A) determining whether the short distance mode is selected,
   A1) fixing the horizontal blades at a downward angle, fixing the vertical blades in a selected direction, and driving fan, if the short distance mode is selected;
B) determining whether the wide distance mode is selected,
   B1) oscillating the vertical blades side-to-side, oscillating the horizontal blades up-and-down at an angle extending above and below horizontal, and driving the fan, if the wide distance mode is selected;
C) determining whether the wave mode is selected,
   C1) fixing the vertical blades to direct air generally forwardly, oscillating the horizontal blades up-and-down at an angle extending above horizontal, and driving the fan, if the wave mode is selected; and
D) determining whether the long distance mode is selected,
   D1) fixing the horizontal blades at an upward angle, oscillating the vertical blades side-to-side, and driving the fan, if the distant distance mode is selected.

2. The method according to claim 1 wherein step A1 comprises fixing the vertical blades selectively in one of a rightward position, a central position, and a leftward position.

3. The method according to claim 1 wherein step B1 comprises oscillating the vertical blades intermittently.

4. The method according to claim 1 wherein the steps A, B, C and D comprise actuating respective keys on a manual control panel of the air conditioner.

5. The method according to claim 1 further comprising the step of visually displaying the selected operation mode on a display panel.

* * * * *